United States Patent [19]

Schmidt

[11] 4,282,723

[45] Aug. 11, 1981

[54] COUPLING

[76] Inventor: Richard Schmidt, 11525 Islandale Dr., Cincinnati, Ohio 45240

[21] Appl. No.: 82,928

[22] Filed: Oct. 9, 1979

[51] Int. Cl.³ .............................................. F16D 3/70
[52] U.S. Cl. .......................................... 64/19; 64/12; 64/31
[58] Field of Search ............... 64/31, 19, 12, 13, 11 R, 64/6

[56] References Cited

U.S. PATENT DOCUMENTS

| 268,807 | 12/1882 | Landis | 64/31 |
|---|---|---|---|
| 2,860,495 | 11/1958 | Stark | 64/11 R |
| 3,242,694 | 3/1966 | Schmidt | 64/31 |
| 3,625,024 | 12/1971 | Kikuchi | 64/19 |
| 3,791,170 | 2/1974 | Schmidt | 64/31 |
| 4,019,345 | 4/1977 | Fukuda | 64/19 |
| 4,033,144 | 7/1977 | Allen | 64/19 |

Primary Examiner—Ira S. Lazarus
Assistant Examiner—Magdalen Moy
Attorney, Agent, or Firm—Cushman, Darby & Cushman

[57] ABSTRACT

A coupling for uniformly transmitting torque from a first shaft to a second shaft while accommodating parallel, angular and/or axial misalignment between the axes of said first and second shafts. The coupling comprises a first annular member adapted to be fixed to the first shaft, a second annular member adapted to be fixed to the second shaft, a third intermediate member including an annular portion disposed between the first and second annular members and first and second pairs of elongated generally parallel arm portions operatively associated with the first and second annular members respectively. Each of the arm portions includes a fixed end fixedly interconnected with the annular portion within the axial extent thereof and a free end connected with the associated annular member by a connecting element projecting axially from the associated annular member each arm portion having a transverse extent measured in the axial direction which is substantially greater than its transverse extent measured in the radial direction so as to provide longitudinal rigidity for uniform torque transmission, a flexure capability in the radial transverse direction to accommodate parallel misalignment and a lesser flexure capability in the axial transverse direction to accommodate angular and axial misalignment.

19 Claims, 7 Drawing Figures

COUPLING

This invention relates to couplings and more particularly to couplings of the type adapted to transmit torque between two shafts.

The art of coupling two shafts together so that the torque of one is transmitted to the other is an old and highly developed art. Perhaps the simplest coupling consists essentially of a sleeve which is capable of receiving within its opposite ends the free end portions of the two shafts to be connected. Such a simple coupling will function quite well provided that the two shafts are exactly in line. Where misalignment occurs, either wanted or unwanted, the coupling must be constructed so as to accommodate such misalignment. A major characteristic of any coupling which is used to accommodate misalignment is that the coupling should be capable of transmitting the torque from one coupling to the other so that the torque output exactly conforms at all times with the torque input. For example, it is well known that a conventional universal joint, while capable of accommodating angular misalignment, has the characteristic of converting a uniformly applied input torque to a cyclically imposed or sinusoidal output torque. Considerable complexity is required to be introduced into the coupling in order to insure the uniform transmission of torque.

A universal joint is a coupling which is designed primarily to transmit torque between two shafts which are angularly related to one another. Angular displacement constitutes one of three possible misalignments which can occur between two shafts. A second important misalignment is a displacement of the two shafts so that the axis of rotation of one is displaced parallel to the other axis. A coupling capable of accommodating parallel misalignment while maintaining uniform torque transmission is disclosed in my U.S. Pat. No. 3,242,694, dated Mar. 29, 1966. The three disc, six link coupling disclosed in this patent has been and is now produced commercially under the trademark "SCHMIDT COUPLINGS" ®. The third misalignment capability is misalignment in the axial direction which, when presented by itself, can be readily accommodated.

When substantial single misalignments are contemplated it is preferable to utilize a coupling designed specifically to accommodate that single misalignment. However, a much more frequently presented situation in torque transmission is the need to join two shafts which are designed to be in alignment but which may in actual practice present any one or more than one of the above-described misalignments to a small extent. A single coupling designed to accommodate any one or a combination of all three of the aforesaid misalignments is disclosed in my prior U.S. Pat. No. 3,791,170. The coupling disclosed in this patent is similar to the original SCHMIDT coupling in its basic construction, in that it is made up of three discs interconnected by links through pin connections. In order to provide for all three types of misalignment it is necessary to provide spherical bearings in at least some of the pin connections.

As indicated in my U.S. Pat. No. 3,791,170, a significant advantage of the arrangement provided is that like the SCHMIDT coupling it is capable of transmitting the torque uniformly from the driving shaft to the driven shaft. The coupling disclosed in my U.S. Pat. No. 3,791,170 is commercially marketed under the name "SCHMIDT In-Line Coupling". While the SCHMIDT In-Line Coupling does a highly acceptable job in uniformly transmitting torque between two shafts which may have misalignment, as aforesaid, the cost involved in securing the precision required is such as to discourage widespread use. Thus, unless in a particular application precision is sufficiently important to warrant the costs involved, less expensive couplings are utilized. Usually these less expensive couplings embody resilient elements which are either compressed, stretched or flexed during operation. Examples of couplings which utilize flexible elements are contained in the following U.S. Pat. Nos.: 1,390,514; 2,181,888; 2,566,575; 2,721,457; 2,864,245; 2,867,102; 2,867,103; 2,907,563; 3,625,024; 4,019,345; and 4,033,144. (See also Lovejoy Saga-7 Coupling.)

While the above list cannot be considered exhaustive of the many thousands of couplings described in the patented literature, they serve to exemplify the difficulty encountered in undertaking to provide a coupling which has both the basic capability of transmitting torque uniformly and the capacity to readily accommodate any one or any combination of the aforesaid three misalignments. While all of the above-noted patents utilize flexible or resilient elements which tend to reduce costs, not one of these prior art couplings provides the dual capability of transmitting torque uniformly and accommodating any one or any combination of the aforesaid three misalignments.

Accordingly, it is an object of the present invention to provide a coupling of simplified construction which utilizes material resilience and flexibility (i.e. material displacement) to accommodate any and all misalignments and which also has the capability of transmitting the torque from the input shaft to the output shaft uniformly. In accordance with the principles of the present invention this objective is obtained by providing a three-part coupling which comprises first and second annular members adapted to be fixed to first and second shafts respectively and an intermediate member having an axis of rotation aligned with the axes of rotation of the first and second annular members when the axes of the latter are aligned. The intermediate member includes an annular portion disposed between the first and second annular members and first and second pairs of elongated generally parallel arm portions operatively associated with the first and second annular members respectively, each of the arm portions having a fixed end fixedly interconnected with the annular portion within the axial extent thereof and a free end. A first pair of connecting elements fixedly projects axially from the first annular member and connects with the free ends of the first pair of parallel arm portions at positions related to the longitudinal extent of the first pair of parallel arm portions and the position of fixed connection of the fixed ends thereof with the annular portion so as to cause torque fixedly transmitted to the first annular member by the first shaft to be transmitted longitudinally through one of the first pair of arm portions to the annular portion under tension without longitudinal material displacement and through the other of the first pair of arm portions to the annular portion under compression without longitudinal material displacement while enabling through transverse material flexure of the first pair of arm portions the following relative motions of the annular portion with respect to the first annular member (1) a parallel linkage type substantially rectilinear movement in a first transverse direction generally perpendicular to the longitudinal extent of the first pair of parallel arm portions, (2) an angular movement about an axis extending generally in said first transverse direction, and (3) an axial movement. A second pair of connecting elements projects axially from the second annular member and connects with the free ends of the second pair of parallel arm portions at positions related to the longitudinal extent of the second pair of parallel arm portions and the position of fixed connection of the fixed ends thereof with the annular portion so as to cause torque transmitted to the annular portion to be transmitted longitudinally through one of the second pair of arm portions to the second annular member under tension without longitudinal material displacement and through the other of the second pair of arm portions to the second annular member under compression without longitudinal material displacement while enabling through transverse material flexure of the second pair of arm portions the following relative motions of the annular portion with respect to the second annular member: (1) a parallel linkage type substantially rectilinear movement in a second transverse direction generally perpendicular to the longitudinal extent of the second pair of parallel arm portions and the first transverse direction, (2) an angular movement about an axis extending generally in the second transverse direction, and (3) an axial movement.

Another object of the present invention is the provision of a coupling of the type described which is simple in construction, effective in operation and economical to manufacture.

These and other objects of the present invention will become more apparent during the course of the following detailed description and appended claims.

The invention may best be understood with reference to the accompanying drawings, wherein an illustrative embodiment is shown.

Figure 1:
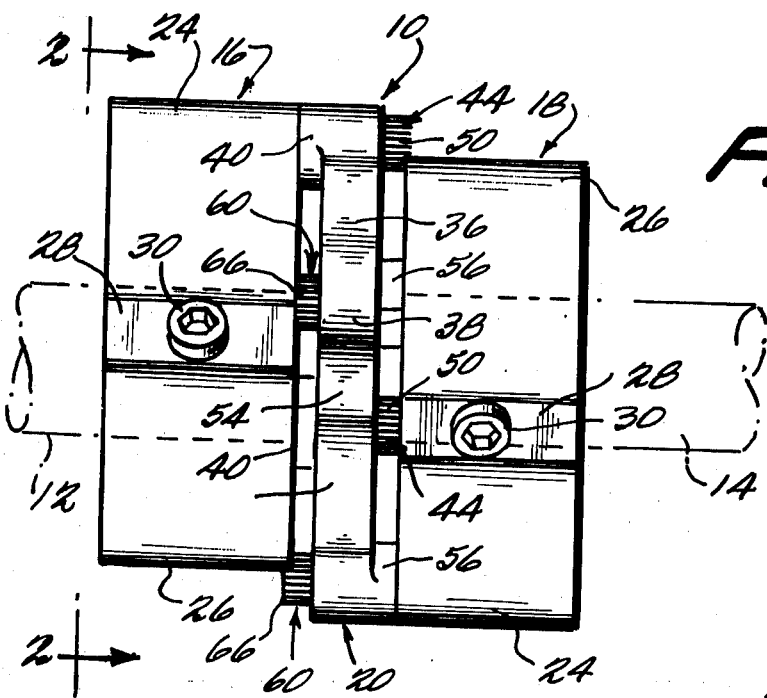
FIG. 1 is a side elevational view of a coupling embodying the principles of the present invention.

Referring now more particularly to the drawings, there is shown therein a coupling, generally indicated at 10, embodying the principles of the present invention, which has the capability of uniformly transmitting torque from a first shaft, indicated in phantom lines at 12 in FIG. 1, to a second shaft, indicated at 14 in phantom lines in FIG. 1, while accommodating parallel, angular and/or axial misalignment between the axes of the first and second shafts. The coupling consists essentially of three members which include first and second annular members, generally indicated at 16 and 18, suitably fixed to the first and second shafts 12 and 14 respectively, and an intermediate member, generally indicated at 20, disposed between the first and second annular members 16 and 18 and operatively connected therewith in a manner hereinafter to be more fully described.

The first and second annular members 16 and 18 are preferably of substantially identical construction so that a description of one will suffice to give an understanding of both. Preferably, each of the annular members is of constant cross-sectional configuration throughout its axial extent so that each is susceptible to being initially fabricated by an extrusion process. Under these circumstances, a preferred extrusion material is aluminum or suitable alloys thereof particularly adapted for extrusion processing. It will be understood however, that while an extrudable configuration is preferred, each of the members may be machined, molded or otherwise fabricated of any other appropriate material such as ferrous metals, resinous plastics or the like.

Figure 2:
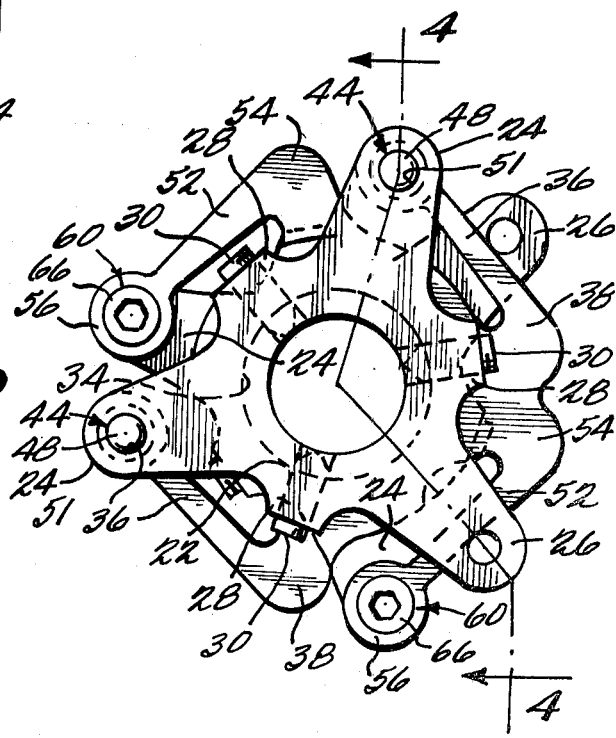
FIG. 2 is an end view taken along the line 2—2 of FIG. 1.
Figure 3:
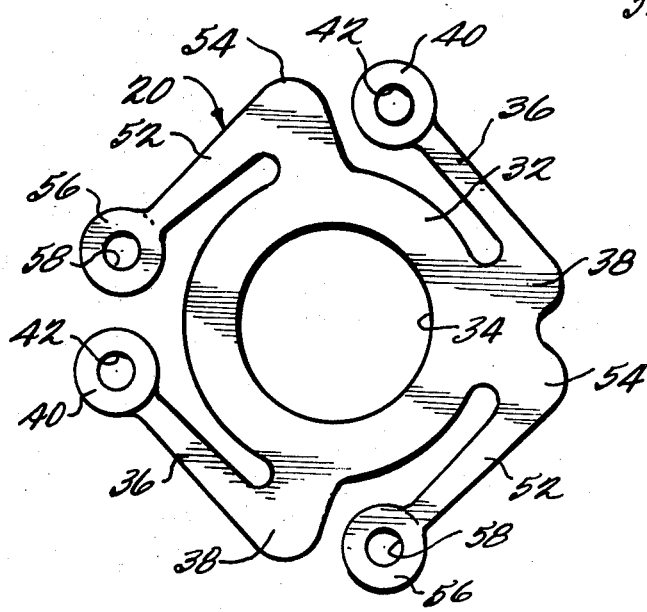
FIG. 3 is a face view of an intermediate member of the coupling.

As best shown in FIG. 2, each of the annular members 16 and 18 is constructed so as to include a ring-shaped annular portion 22 having a pair of connecting element receiving portions 24 extending radially outwardly therefrom at positions spaced apart approximately 120°. In order to render each annular member symmetrical about its axis of rotation, a third portion 26 similar in configuration to the pair of portions 24 extends radially outwardly from the ring-shaped annular portion 22 at a position spaced apart 120° from each of the other two portions 24. In addition, each member 16 and 18 also includes three set screw receiving portions 28 which extend radially outwardly from the annular portion 22 to an extent considerably less than the portions 24 and 26 at positions spaced equally between the portions 24 and 26.

In the embodiment shown in the drawings, three set screws 30 are mounted so as to extend radially through the portions 28 and the adjacent sections of the annular portion 22. It will be understood that only one set screw may be provided and that such set screw may be utilized to rigidly secure a key member within a keyway formed in the interior periphery of the annular portion. Also it will be understood that any other known manner of effecting the fixed connection between each of the annular members and the associated shaft may be utilized if desired. It will be noted, however, that each mounting is such that the symmetrical axis of the respective member is coincident with the axis of the shaft to which it is fixed.

The intermediate member 20 is preferably molded of a plastic material, a preferred material being polyoxymethylene resin, examples of which are available commercially under the trademarks CELCON® and DELRIN®. While these materials are preferred and are regarded to be quite satisfactory in operation, it will be understood that other material having the required characteristics hereinafter set forth may be utilized if desired. In the embodiment shown, the intermediate member constitutes a single molding of the aforesaid polyoxymethylene resinous material. As shown, the intermediate member includes a ring-shaped annular portion 32 having a cylindrical interior periphery 34 of a diameter size greater than the diameter size of the central shaft openings in the annular members 16 and 18 so as to permit the shaft 12 and/or the shaft 14 to extend axially into the axial space occupied by the intermediate member without contacting the same while accommodating the aforesaid parallel, angular and/or axial misalignment. The intermediate member 20 also includes a first pair of generally parallel arm portions 36 which are associated with the first annular member 16. Each of the arm portions 36 includes a fixed end 38 which is fixedly connected with the annular portion 32 within the axial extent thereof as by an integral connection. Each arm portion 36 also includes a free end 40 having a cylindrical opening 42 extending therethrough in a direction perpendicular to the axis of the intermediate member 20. Each of the free ends 40 is of generally cylindrical shape having an axial extent which is coextensive with the associated arm portion 36 and annular portion 32 and projects therebeyond in a direction toward the first annular member a short distance as, for example, approximately ⅓ to ½ the axial extent of the arm portion and annular portion 32.

Figure 4:
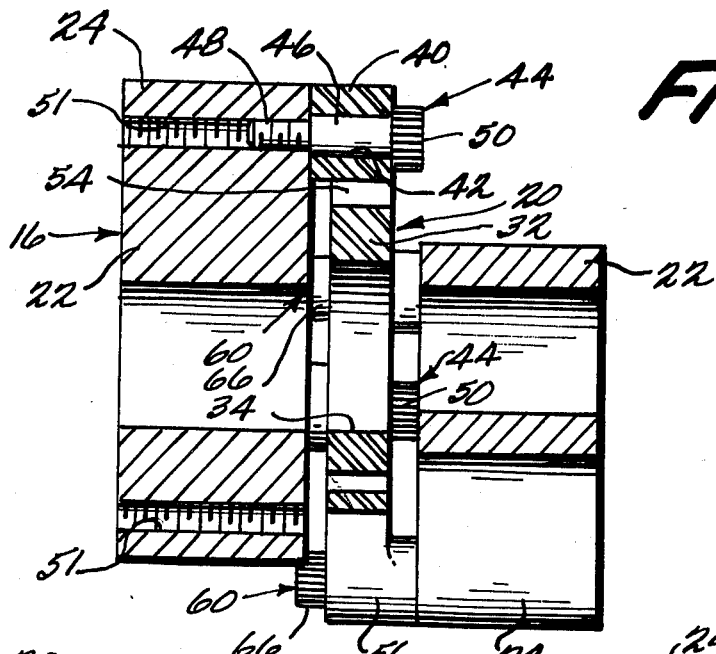
FIG. 4 is a sectional view taken along the line 4—4 of FIG. 2.
Figure 5:
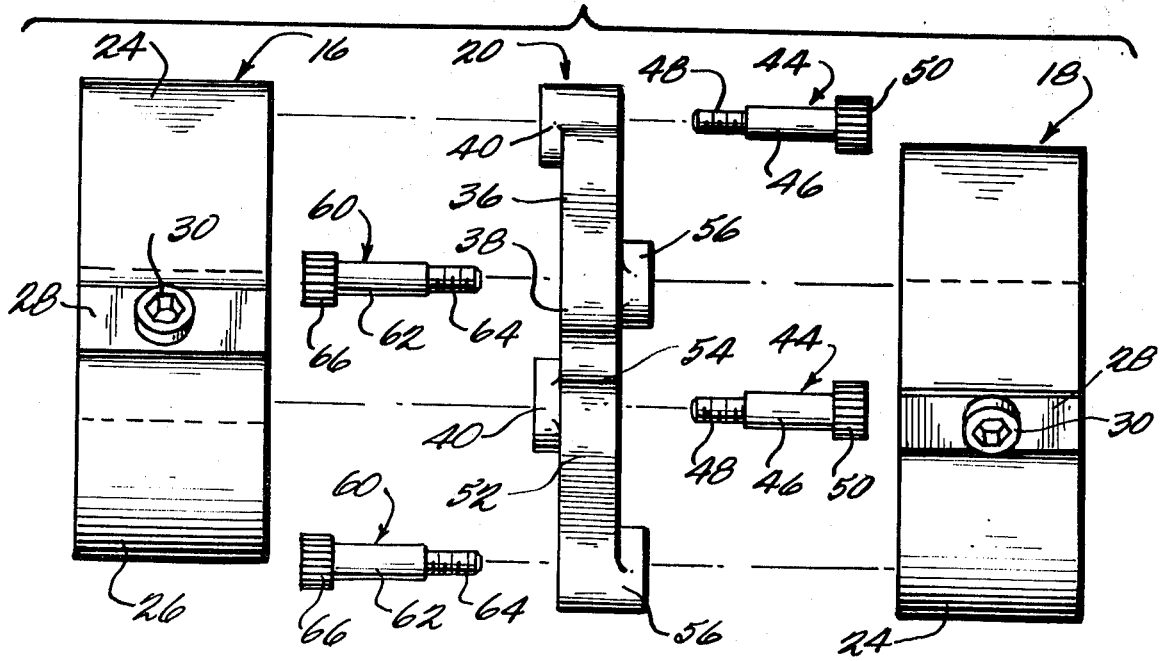
FIG. 5 is an exploded side elevational view of the coupling.

The pair of free ends 40 is connected to the first pair of projecting portions 24 of the first annular member 16 by a pair of shoulder bolts 44. As best shown in FIGS. 4 and 5, shoulder bolts 44 are of generally conventional construction and include central cylindrical sections 46 having threaded sections 48 extending from one end thereof and an enlarged head 50 formed on the other end. The cylindrical sections rotatably engage in axially coextensive relation within the cylindrical openings 42 while the threaded sections 48 threadedly engage within threaded openings 51 extending axially through the connecting element receiving portions 24 of the first annular member 16.

It will be noted that the operative connection between the first annular member 16 and intermediate member 20 provided by the connecting elements 44 is related to the longitudinal extent of the pair of parallel arm portions 36 and the position of fixed connection of the fixed ends 38 thereof with annular portion 32 such as to cause torque fixedly transmitted to the first annular member 16 by the first shaft 12 to be transmitted longitudinally through one of the portions 36 to the annular portion 32 under tension and through the other arm portion 36 under compression. With reference to FIG. 2, when annular member 16 is rotated clockwise, the arm portion 36 in the upper right-hand quadrant of the Figure is in compression while the other arm portion 36 in the lower left-hand quadrant is in tension. Reversing the direction of rotation of the annular member will reverse the arm portions in compression and tension.

It will be noted that when the axes of the first and second annular members are in alignment the annular member 20 has an axis which is coincident therewith. The annular portion 32 has its axis coincident with this axis and the parallel arm portions 36 have their longitudinal extent so positioned that forces transmitted longitudinally therethrough act essentially tangentially to the axis of the intermediate member. It will also be noted that the transverse extent of each arm portion 36 measured in the axial direction is substantially less than the longitudinal extent of the arm portion and substantially greater than the transverse extent of the arm portion measured in the radial direction. Consequently, since torque transmittal from the first annular member to the intermediate member is along a line generally coincidental with the longitudinal extent of the arm portions 36 substantially no material displacement occurs by virtue of the torque transmission and hence the torque which is imparted to the first annular member 16 will likewise be uniformly transmitted to the annular portion 32 of the intermediate member. While the arm portions 36 remain rigid in the direction of torque transmission and therefore accomplish uniform torque transmission, they are capable of flexing transversely. With the arrangement shown transverse flexing in a radial direction is accommodated more readily than transverse deflection in an axial direction due to the relative material thickness previously noted.

By virtue of the connection of the free ends 40 and fixed ends 38 of the arm portions 36, transverse deflection in a radial direction of the arm portions results in parallel linkage type of translational movement in a transverse direction which extends in a direction generally perpendicular to the longitudinal direction of extent of the arm portions 36. In this regard it will be noted that a plane passing through the axis of the intermediate member which is perpendicular to the longitudinal extent of the parallel arm portions 36 bisects the arm portions so that the amount of material in each arm portion on one side of the plane is generally equal to the amount of material on the opposite side thereof. The parallel linkage type translational movement is accomplished by a pivotal movement of the free ends 40 of the arm portions 36 by virtue of the rotatable movement of the cylindrical sections 46 of the connecting elements 44 within the cylindrical openings 42 of the free ends 40 and a flexure or material displacement of the arm portions 36 about the fixed ends 38 thereof. The pivotal connection of the connecting elements 44 with the free ends enables each arm portion to act in the nature of a diving board or spring board. An arrangement of this type permits a greater degree of flexure. In situations where a lesser degree of parallel misalignment is to be accommodated the connection between the free ends of the arm portions and the connecting element can be a fixed connection, as for example, by extending a fastener radially through each fixed end and the associated connecting element.

The transverse flexure of the arm portions 36 in the axial direction accommodates an angular displacement of the axis of intermediate member 20 with respect to the axis of the first annular member 16 about an axis which extends in a direction perpendicular to the longitudinal extent of the arm portions 36. Transverse flexure of the arm portions 36 in the axial direction also accommodates axial displacement as well. Both the angular and axial displacement can take place in both directions without interference by virtue of the axial projections of the free ends 40 of the intermediate member 20. In this regard it will be noted that each of these projections may be provided by a separate washer or as part of the associated connecting element in which case the intermediate member is rendered susceptible to fabrication by extrusion techniques.

The intermediate member 20 also includes a second pair of generally parallel arm portions 52 disposed so that their longitudinal extent is in a direction generally perpendicular to the longitudinal direction of extent of the arm portions 36. Each arm portion 52 is constructed in a manner similar to the arm portions 36 to include an integral fixed end 54 and a free end 56 having a cylindrical opening 58 extending therethrough to receive a connecting element 60. Each of the connecting elements 60 is of similar construction to the connecting elements 44 consisting essentially of a shoulder bolt having a cylindrical central section 62 with a threaded section 64 of reduced diameter on one end thereof and a head 66 on the other end thereof. The cylindrical sections 62 of the bolts 60 rotatably engage in axially coextensive relation within the cylindrical openings 58 while the threaded sections 64 threadedly engage within threaded openings extending axially through the connecting element receiving portions 24 of the second annular member 18.

It will be noted that the operative connection between the second annular member 18 and intermediate member 20 provided by the connecting elements 44 is related to the longitudinal extent of the pair of parallel arm portions 52 and the position of fixed connection of the fixed ends 54 thereof with annular portion 32 such as to cause torque transmitted to the annular portion through arm portions 38 to be transmitted longitudinally through one of the arm portions 52 to the second annular member 18 under tension and through the other arm portion 52 under compression. With reference to FIG. 2, when the annular portion 32 of the intermediate member 20 is rotated clockwise, the arm portion 52 in the upper left-hand quadrant of the Figure is in tension while the other arm portion 52 in the lower right-hand quadrant is in compression. As before, reversing the direction of rotation of the intermediate member 20 will reverse the arm portions in compression and tension.

Again it will be noted that forces transmitted longitudinally through the arm portions 52 act essentially tangentially to the axis of the intermediate member 20. It will also be noted that the transverse extent of each arm portion 52 measured in the axial direction is substantially less than the longitudinal extent of the arm portion and substantially greater than the transverse extent of the arm portion measured in the radial direction. Consequently, since torque transmittal from the annular portion 32 to the second annular member is along a line generally coincidental with the longitudinal extent of the arm portions 52 substantially no material displacement occurs by virtue of this torque transmission and hence the torque which is imparted to the annular portion 32 of the intermediate member will likewise be uniformly transmitted to the second annular member 18. While the arm portions 52 remain rigid in the direction of torque transmission and therefore accomplish uniform torque transmission, they are capable of flexing transversely. With the arrangement shown transverse flexing in a radial direction is accommodated more readily than transverse deflection in an axial direction due to the relative material thickness previously noted.

By virtue of the connection of the free ends 56 and fixed ends 54 of the arm portions 52, transverse deflection in a radial direction of the arm portions results in parallel linkage type of translational movement in a transverse direction which extends in a direction generally perpendicular to the longitudinal direction of extent of the arm portions 52, which direction is substantially perpendicular to the direction of parallel linkage type translational movement provided by arm portions 36. In this regard it will be noted that a plane passing through the axis of the intermediate member which is perpendicular to the longitudinal extent of the parallel arm portions 52 bisects the arm portions so that the amount of material in each arm portion on one side of the plane is generally equal to the amount of material on the opposite side thereof. The parallel linkage type translational movement is accomplished by a pivotal movement of the free ends 56 of the arm portions 52 by virtue of the rotatable movement of the cylindrical sections 62 of the connecting elements 66 within the cylindrical openings 58 of the free ends 56 and a flexure or material displacement of the arm portions 52 about the fixed ends 54 thereof. The pivotal connection of the connecting elements 60 with the free ends 56 enables each arm portion 52 to act in the nature of a diving board or spring board in a manner similar to arm portions 36. An arrangement of this type permits a greater degree of flexure. As before, in situations where a lesser degree of parallel misalignment is to be accommodated, the connection between the free ends of the arm portions and the connecting element can be a fixed connection, as for example, by extending a fastener radially through each fixed end and the associated connecting element.

The transverse flexure of the arm portions 52 in the axial direction accommodates an angular displacement of the axis of intermediate member 20 with respect to the axis of the second annular member 18 about an axis which extends in a direction perpendicular to the longitudinal extent of the arm portions 52. Transverse flexure of the arm portions 52 in the axial direction also accommodates axial displacement as well. Both the angular and axial displacement can take place in both directions without interference by virtue of the axial projections of the free ends 56 of the intermediate member 20.

The operation of the coupling 10 is believed to be evident from the description set forth above. The parallel linkage type translational movements in two perpendicular radial directions provided by the parallel arm portions 36 and 52 serve to accommodate parallel misalignments between the shafts 12 and 14. It will be understood that during one revolution both translational movements will take place generally as out of phase sine waves when plotting translational displacement with respect to degrees of rotation. Angular misalignment between the shafts is accommodated by the angular flexure about two transverse axes which are perpendicular and here again, during a single rotation the angular displacement in one direction has a sinusoidal amplitude which is out of phase with a similar sinusoidal amplitude of the angular displacement about the axis in the perpendicular direction. Where axial misalignment alone is presented normally such misalignment will be accommodated by the mounting of the coupling on the shafts. However, the flexure of the arm portions enables the coupling to be mounted so that in operation in axial misalignment can be accommodated. This is particularly important when axial misalignment is combined with parallel or angular misalignment, or both.

Figure 6:
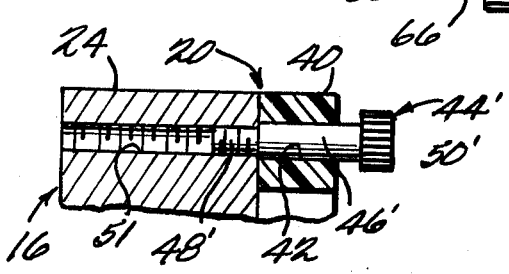
FIG. 6 is a fragmentary sectional view similar to FIG. 4 of a coupling of modified form.

FIG. 6 illustrates a modification in the coupling 10 which enables the same to accommodate an increased amount of axial misalignment. As shown, the modification simply involves the utilization of a pair of shoulder bolts 44' in lieu of the pair of shoulder bolts 44. Each shoulder bolt 44' includes a central cylindrical section 46', a threaded end section 48' of reduced diameter size and a head 50' of increased size in a manner similar to bolt 44. However, the central section 46' of each bolt 44' is longer than the central section 46 of each bolt 44 thus enabling a limited amount of axial movement of the intermediate member to take place between the threaded end 48' fixed within the associated threaded opening 51 of portion 24.

Figure 7:
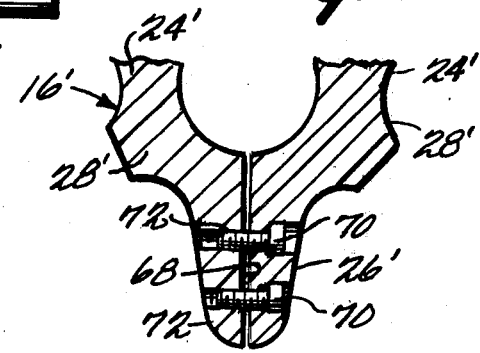
FIG. 7 is a fragmentary vertical sectional view of a first coupling member of modified form.

FIG. 7 discloses another desirable modification in the structure provided for effecting the rigid securement of the member 16 or 18 to its respective shaft as shown, member 16 is replaced by a member 16' in which the portions 28' are not drilled and tapped to receive set screws 30 as is the case with set screw receiving portions 28 of the members 16 and 18. Instead, the third portion 26' is split radially into two sections, as indicated at 68, and a pair of bolts 70 is mounted in suitable openings 72 in the portion 26' in such a way that tightening of the bolts 70 causes the split sections of the portion 26' to move together and apply a gripping action on associated shaft onto which the member 16' has been mounted. By loosening bolts 70, the grip on the shaft is released and the member 16' can be removed from the shaft.

It will be understood that while the operation of the coupling 10 has been described in relation to a particular fixed connection with a driving shaft 12 and a driven shaft 14 the coupling is capable of similar operation when fixed in reversed arrangement to the shafts or alternatively the driven shaft becomes the driving shaft, and vice versa.

The coupling presents particularly desirable and advantageous mounting characteristics with respect to shafts. First, it will be noted that the three major components of the coupling, namely the first and second annular members 18 and the intermediate member 20, are capable of being disassembled from operative relationship by the simple removal of the four shoulder bolts. The configuration of the annular members 16 and 18 with respect to the bolts is such that axial access to the heads of the bolts can be readily obtained. Thus, the first annular member, while including radially projecting portions 24 which receive the bolts 44 connecting the first pair of arm portions 36 therewith, is devoid of material in an axial position of alignment with the second pair of bolts 60. A similar relationship is presented with respect to the second annular member 18 and the bolts 44 and 60. This ready access to heads of the bolts enables the operator to conveniently use a bolt loosening and tightening tool to effect disassembly and assembly of the coupling. The mounting of the coupling to the shafts can therefore be conveniently accomplished either with the coupling 10 preassembled or disassembled, in which case assembly can be readily accomplished after the first and second annular members have been suitably fixed to their respective shafts. Moreover, this simple disassembly procedure enables an operator to quickly replace a worn-out intermediate member with a new one should the occasion demand.

The provision of a third radially projecting portion on each of the annular members 16 and 18 serves to dynamically balance these members, a desirable feature particularly in high speed applications. In the drawings the third projecting portion 26 is shown as having a threaded opening 51 similar to the threaded openings 51 formed in the portions 24. It will be understood that the openings in the portions 26 may be simply omitted. However, they are preferably provided so that where a higher degree of dynamic balancing is required shoulder bolts can be mounted therein.

Finally, it will be noted that the radially projecting configuration of the two outer annular members of the coupling provide in operation, particularly in high speed installations, a fan effect which tends to maintain the coupling in a cool running condition.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A coupling for uniformly transmitting torque from a first shaft to a second shaft while accommodating parallel, angular and/or axial misalignment between the axes of said first and second shafts, said coupling comprising:

a first annular member having means for fixedly securing the same to the first shaft for rotation therewith about an axis of rotation coincident with the axis of the first shaft, a second annular member having means for fixedly securing the same to the second shaft for rotation therewith about an axis of rotation coincident with the axis of the second shaft, a third intermediate member having an axis of rotation aligned with the axes of rotation of said first and second annular members when the axes of the latter are aligned, said intermediate member including an annular portion disposed between said first and second annular members and first and second pairs of elongated generally parallel arm portions operatively associated with said first and second annular members respectively, each of said arm portions including a fixed end fixedly interconnected with said annular portion within the axial extent thereof and a free end, a first pair of connecting elements fixedly projecting axially from said first annular member and connected with the free ends of said first pair of parallel arm portions at positions related to the longitudinal extent of said first pair of parallel arm portions and the position of fixed connection of the fixed ends thereof with said annular portion so as to cause torque fixedly transmitted to said first annular member by the first shaft to be transmitted longitudinally through one of said first pair of arm portions to said annular portion under tension without longitudinal material displacement and through the other of said first pair of arm portions to said annular portion under compression without longitudinal material displacement while enabling through transverse material flexure of said first pair of arm portions the following relative motions of said annular portion with respect to said first annular member (1) a parallel linkage type substantially rectilinear movement in a first transverse direction generally perpendicular to the longitudinal extent of said first pair of parallel arm portions, (2) an angular movement about an axis extending generally in said first transverse direction, and (3) an axial movement, and a second pair of connecting elements projecting axially from said second annular member and connected with the free ends of said second pair of parallel arm portions at positions related to the longitudinal extent of said second pair of parallel arm portions and the position of fixed connection of the fixed ends thereof with said annular portion so as to cause torque transmitted to said annular portion to be transmitted longitudinally through one of said second pair of arm portions to said second annular member under tension without longitudinal material displacement and through the other of said second pair of arm portions to said second annular member under compression without longitudinal material displacement while enabling through transverse material flexure of said second pair of arm portions the following relative motions of said annular portion with respect to said second annular member; (1) a parallel linkage type substantially rectilinear movement in a second transverse direction generally perpendicular to the longitudinal extent of said second pair of parallel arm portions and said first transverse direction, (2) an angular movement about an axis extending generally in said second transverse direction, and (3) an axial movement.

2. A coupling as defined in claim 1 wherein each of said first and second annular members includes an annular hub portion and a pair of connecting element receiving portions extending radially outwardly at approximately 120° from one another.

3. A coupling as defined in claim 2 wherein said first annular member is configured to be symmetrical about its axis and to be devoid of material at positions aligned axially with said second pair of connecting elements when the axes of all of said annular members are aligned, said second annular member being configured to be symmetrical about its axis and to be devoid of material at positions aligned axially with said first pair of connecting elements when the axes of all of said annular members are aligned.

4. A coupling as defined in claim 3 wherein each of said first and second annular members includes a third portion of a configuration similar to said pair of connecting element receiving portions extending radially outwardly from said annular hub portion at a position approximately 120° from each of said pair of connection element receiving portions.

5. A coupling as defined in claim 4 wherein said first and second annular members include three set screw receiving portions extending radially outwardly from said hub portion to an extent substantially less than said connecting element receiving portions at positions spaced equally between the latter and said third portion.

6. A coupling as defined in claim 5 wherein each of said first and second annular members is of uniform cross-sectional configuration throughout the axial extent thereof.

7. A coupling as defined in claim 1, 2, 3, 4, 5 or 6 wherein the annular portion and arm portions of said intermediate member are integrally molded of resin.

8. A coupling as defined in claim 7 wherein the annular portion of said intermediate member is of ring-shaped configuration symmetrical about the axis of said intermediate member, said first pair of parallel arm portions containing a substantially equal amount of material in the sections thereof disposed on opposite sides of a plane passing through the axis of said intermediate member and extending in said first transverse direction, said second pair of parallel arm portions containing a substantially equal amount of material on opposite sides of a plane passing through the axis of said intermediate member and extending in said second transverse direction.

9. A coupling as defined in claim 8 wherein the central section of each arm portion between the fixed end and the free end thereof has a transverse extent measured in the axial direction which is substantially less than its longitudinal extent and substantially greater than its transverse extent measured in the radial direction.

10. A coupling as defined in claim 9 wherein the free ends of said first pair of arm portions extend axially in a direction toward said first annular member beyond the remainder thereof which is axially coextensive with said annular portion, the free ends of said second pair of arm portions extending axially in a direction toward said second annular member beyond the remainder thereof which is axially coextensive with said annular portion.

11. A coupling as defined in claim 7 wherein each of said connecting elements comprises a shoulder bolt having a central cylindrical section of an intermediate size rotatably engaged within a cylindrical opening in the associated arm portion free end, a threaded section of reduced size on one end of said central section fixedly engaged within a threaded opening in the associated annular member and a head of enlarged size on the opposite end of said central section.

12. A coupling as defined in claim 11 wherein the axial extent of the central cylindrical section of each bolt constituting at least one pair of said connecting elements exceeds the axial extent of the cylindrical opening within which it is rotatably engaged.

13. A coupling as defined in claim 7 wherein the interior periphery of said ring-shaped annular portion is of a diameter size sufficiently greater than the diameter size of the first shaft or the second shaft so that either or both of the latter may extend axially into the axial space occupied by said intermediate member without contacting the same while accommodating the aforesaid parallel, angular and/or axial misalignment.

14. A coupling as defined in claim 1, 2, 3, 4, 5 or 6 wherein each of said connecting elements comprises a shoulder bolt having a central cylindrical section of an intermediate size rotatably engaged within a cylindrical opening in the associated arm portion free end, a threaded section of reduced size on one end of said central section fixedly engaged within a threaded opening in the associated annular member and a head of enlarged size on the opposite end of said central section.

15. A coupling as defined in claim 14 wherein the axial extent of the central cylindrical section of each bolt constituting at least one pair of said connecting elements exceeds the axial extent of the cylindrical opening within which it is rotatably engaged.

16. A coupling as defined in claim 1, 2, 3, 4, 5 or 6 wherein the annular portion of said intermediate member is of ring-shaped configuration symmetrical about the axis of said intermediate member, said first pair of parallel arm portions containing a substantially equal amount of material in the sections thereof disposed on opposite sides of a plane passing through the axis of said intermediate member and extending in said first transverse direction, said second pair of parallel arm portions containing a substantially equal amount of material on opposite sides of a plane passing through the axis of said intermediate member and extending in said second transverse direction.

17. A coupling as defined in claim 16 wherein the central section of each arm portion between the fixed end and the free end thereof has a transverse extent measured in the axial direction which is substantially less than its longitudinal extent and substantially greater than its transverse extent measured in the radial direction.

18. A coupling as defined in claim 17 wherein the free ends of said first pair of arm portions extend axially in a direction toward said first annular member beyond the remainder thereof which is axially coextensive with said annular portion, the free ends of said second pair of arm portions extending axially in a direction toward said second annular member beyond the remainder thereof which is axially coextensive with said annular portion.

19. A coupling as defined in claim 3 wherein the shaft securing means of said first and second members each is provided by radially splitting the third portion of the associated member into two sections and mounting bolt means therein capable of moving the two split sections together so as to cause the associated member to rigidly grip the associated shaft on which it is mounted.

* * * * *